United States Patent [19]
Roberts, III

[11] Patent Number: 5,292,215
[45] Date of Patent: Mar. 8, 1994

[54] METAL BOLT WITH A COMPOSITE CORE FOR ENHANCEMENT

[75] Inventor: Herbert C. Roberts, III, Palm Beach Gardens, Fla.

[73] Assignee: The United States of America as represented by the Secretary of the Air Force, Washington, D.C.

[21] Appl. No.: 957,976

[22] Filed: Oct. 7, 1992

[51] Int. Cl.$^5$ ............................................. F16B 35/04
[52] U.S. Cl. .................................. 411/424; 411/901; 411/908
[58] Field of Search ............... 411/378, 424, 900, 901, 411/904, 907, 908

[56] References Cited

U.S. PATENT DOCUMENTS

| | | | |
|---|---|---|---|
| 2,510,693 | 6/1950 | Green | 411/908 |
| 2,949,054 | 8/1960 | White | |
| 4,063,838 | 12/1977 | Michael | 411/908 |
| 4,620,401 | 11/1986 | L'Espérance | 411/908 |
| 4,623,290 | 11/1986 | Kikuzawa | |
| 4,717,302 | 1/1988 | Adams et al. | |
| 4,718,801 | 1/1988 | Berecz | 411/908 |
| 4,824,314 | 4/1989 | Stencel | 411/901 |
| 4,863,330 | 9/1989 | Olez | 411/901 |
| 5,127,783 | 7/1992 | Moghe | 411/901 |
| 5,152,650 | 10/1992 | Kitagawa | 411/908 |

Primary Examiner—Peter M. Cuomo
Assistant Examiner—Flemming Saether
Attorney, Agent, or Firm—Stanton E. Collier; Donald J. Singer

[57] ABSTRACT

The improved metal matrix bolt has a metal shell having the bolt head, shank and threads thereon. The shell has a longitudinal space therein wherein a composite core of fibers is bonded. The fibers are divided into two groups: a longitudinal group and a spiral group. The spiral group wraps clockwise about the longitudinal group and is inclined at an angle of about 30° to 45° degrees from the axis of the bolt. The fibers are bonded within the space to the interior surface of the shell whereby when the bolt is torqued, the bolt has increased tensile strength and reduced thermal axial growth.

5 Claims, 1 Drawing Sheet

METAL BOLT WITH A COMPOSITE CORE FOR ENHANCEMENT

The invention described herein may be manufactured and used by or for the Government for governmental purposes without the payment of any royalty thereon.

BACKGROUND OF THE INVENTION

The present invention relates to fastener, and, in particular, relates to composite fasteners.

For fastening together portions of certain highly stressed constructions, such as aircraft or other assemblies requiring high strength and light weight, many variations of fasteners have been suggested. Most of these prior art fasteners have been made of a core material to which a different material has been applied as a thin protective coating, as by plating, galvanizing, and other application methods. In these fasteners, the reduction in weight has caused a corresponding reduction in strength and/or the ability to withstand one or more of the other forces caused by the stresses to which the assembly may be subjected.

Attempts to overcome the disadvantages of the prior art fasteners have been successful in part but have introduced other shortcomings. Typically, a molded, non-metallic fastener having an external coating of metal provides a lightweight fastener, but is unlikely to have the desired strength to withstand severe stress and tension forces without a significant increase in size. Also, metal coated non-metallic fasteners typically cannot be used in conjunction with metallic structures since the relatively thin metallic coating can be quickly destroyed by the metallic structures, permitting the assembled structures to act against the more fragile core material. Thus, under the high stress conditions in which these fasteners may be used, failures can occur by cutting through or shearing the core.

Another prior art fastener such as shown in U.S. Pat. No. 4,824,314, places a core material such as epoxy-graphite or alloys into a blank shell and the combination is formed into a bolt by the described technique. The shell would have a thickness such as would allow warm rolling and pressure forming. The core material is homogeneous.

Other prior art fasteners having a totally composite construction use selectively oriented resin-impregnated fibers to achieve strength. These fasteners lack sufficient strength both in tensile and shear loading to be of value in critical areas such as aircraft construction. Further, delamination of the fasteners has been a problem and as such special devices are used to reduce this damage. Examples of these are shown in U.S. Pat. Nos. 2,949,054; 4,623,290; and 4,717,302.

Thus, there is clearly a need for a fastener having a composite matrix construction within a metal shell.

SUMMARY OF THE INVENTION

The present invention comprises a metal matrix bolt having a metal shell with a core therein of selectively oriented fibers.

The metal shell has a head, a shank and a threaded section thereon. The shell has an interior space therein running longitudinally therethrough. The interior space may or may not be contained within the metal shell by caps thereon or by other means of sealing.

The core consists of a combination of selectively positioned fibers and, in particular, a first group of fibers running longitudinal and a second group of fibers spirally interfaced with the first group. Appropriate bonding of the core to the shell insures structural integrity.

Therefore, one object of the present invention is to provide a metal matrix bolt.

Another object of the present invention is to provide a metal matrix bolt having increased tensile strength.

Another object of the present invention is to provide a metal matrix bolt having reduced axial growth during thermal expansion.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
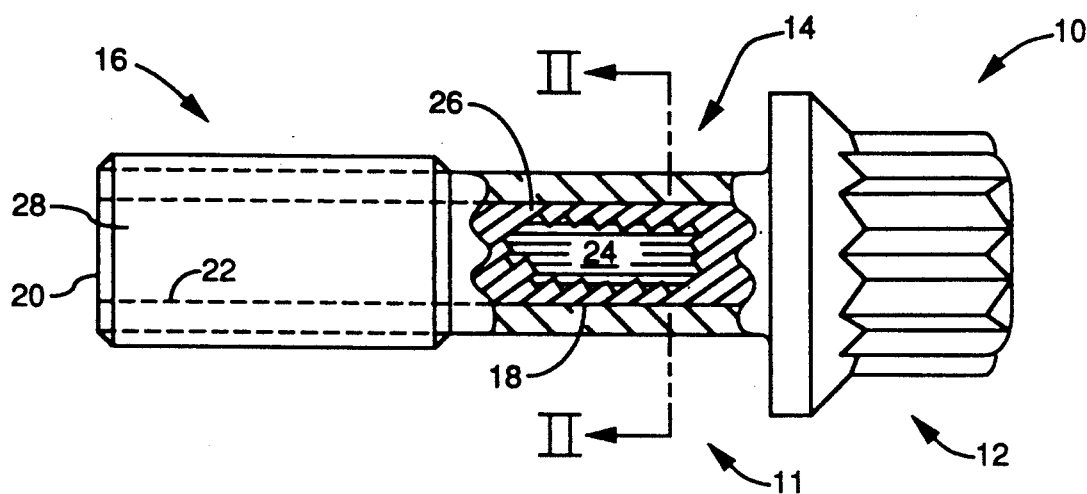
FIG. 1 illustrates by partial cross section a metal matrix bolt the composite core of fibers therein.

Referring to FIG. 1, a metal matrix bolt 10 is shown. As seen therein the metal matrix bolt 10 has a shell 11 comprised of a head 12, a shank 14 and a threaded section 16, without the threads shown thereon. Inside of the bolt 10 is a longitudinal space 18 which may run the full length of the bolt 10 or only partially, such as, for example, through the threaded section 16 and the shank 14. A metal cap 20 may be attached to the threaded section 16 to seal the space 18. The interior surface 22 surrounding the space 18 may be roughened.

U.S. Pat. Nos. 2,949,059; 4,623,290; 4,717,302 and 4,824,314 are incorporated by reference. In particular, U.S. Pat. No. 4,824,314 discloses means for bonding a core material to an outer shell.

Figure 2:
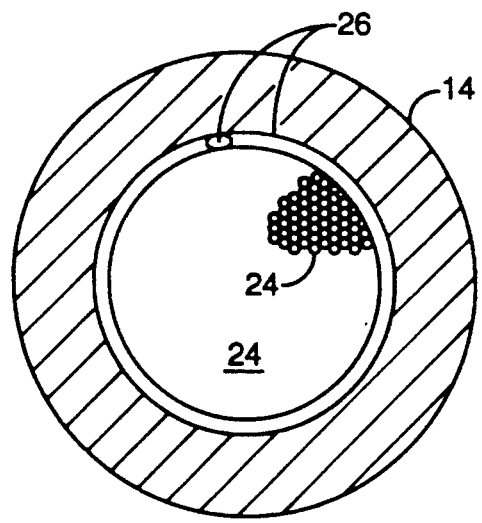
FIG. 2 is a cross section of the metal matrix bolt of FIG. 1.

Inside the space 18 is a composite core 28 of fibers. The fibers are formed into at least one group of longitudinal fibers 24 and at least one group of spiral fibers 26 as seen in FIGS. 1 and 2.

All sizes and shapes shown in the Figures are only for illustration and have no bearing otherwise, unless so stated.

Figure 3:
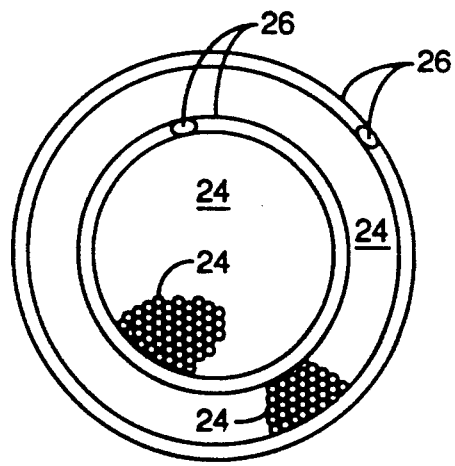
FIG. 3 a composite core having multiple layers of spiral fibers.

As seen in FIG. 3, there are 2 groups of spiral fibers interleaved between the longitudinal fibers 24 for additional strength. Although only one layer of spiral fibers is shown, each group of spiral fibers could have multiple layers therein.

The preform consisting of the groups of fibers is placed within the space 18 and bonded together and to the interior surface 22.

The spiral fibers would be wrapped clockwise as seen from the head 12 around other fibers in a spiral fashion. The inclined angle of the spiral as seen from FIG. 1 would be from about 30° to about 45° As a result, when the bolt 10 is torqued down, the spiral fibers would resist such. The combination of fiber group 24 and 26 would allow the shank 14 to be of a smaller diameter because of the increased tensile strength. Further, the size of the bolt 10 could be reduced. Another benefit of the metal matrix bolt 10 occurs as a result of the composite core 28 counter-balancing the expansion of the metal thus reducing axial growth and reducing pre-load values.

Clearly, many modifications and variations of the present invention are possible in light of the above teachings and it is therefore understood, that within the inventive scope of the inventive concept, the invention may be practiced otherwise than specifically claimed.

What is claimed is:

1. An improved metal matrix bolt, said metal matrix bolt comprising:
    a metal shell, said metal shell comprising:
        a head;
        a shank; said shank attached to said head; and
        a threaded section, said threaded section attached to said shank, said shell having a longitudinal space substantially therethrough; and
    a composite core, said composite core being bonded within said longitudinal space, said composite core comprising:
        at least one group of longitudinal fibers; and
        at least one group of spiral fibers, said spiral fibers being bonded to said at least one group of longitudinal fibers.

2. An improved metal matrix bolt as defined in claim 1 wherein there is only one group of said longitudinal and said spiral fibers.

3. An improved metal matrix bolt as defined in claim 1 wherein said spiral fibers are wrapped clockwise about said longitudinal fibers as viewed from said head.

4. An improved metal matrix bolt as defined in claim 3 wherein said spiral fibers are inclined at an angle of about 30° to about 45° to an axis of said bolt.

5. An improved metal matrix bolt as defined in claim 1 wherein said fibers are composite fibers.

* * * * *